W. MORRISON.
REVERSIBLE GALVANIC BATTERY.
APPLICATION FILED OCT. 10, 1910.

976,092.

Patented Nov. 15, 1910.

6 SHEETS—SHEET 1.

Witnesses:

Inventor:
William Morrison
By Bulkley & Durand
Attys

W. MORRISON.
REVERSIBLE GALVANIC BATTERY.
APPLICATION FILED OCT. 10, 1910.

976,092.

Patented Nov. 15, 1910.

6 SHEETS—SHEET 2.

Witnesses:

Inventor:
William Morrison
By Bulkley & Durand
Attys

W. MORRISON.
REVERSIBLE GALVANIC BATTERY.
APPLICATION FILED OCT. 10, 1910.

976,092.

Patented Nov. 15, 1910.

6 SHEETS—SHEET 3.

Witnesses:

Inventor:
William Morrison
By Bulkley & Durand
Attys

W. MORRISON.
REVERSIBLE GALVANIC BATTERY.
APPLICATION FILED OCT. 10, 1910.

976,092.

Patented Nov. 15, 1910.
6 SHEETS—SHEET 5.

W. MORRISON.
REVERSIBLE GALVANIC BATTERY.
APPLICATION FILED OCT. 10, 1910.
976,092.
Patented Nov. 15, 1910.
6 SHEETS—SHEET 6.
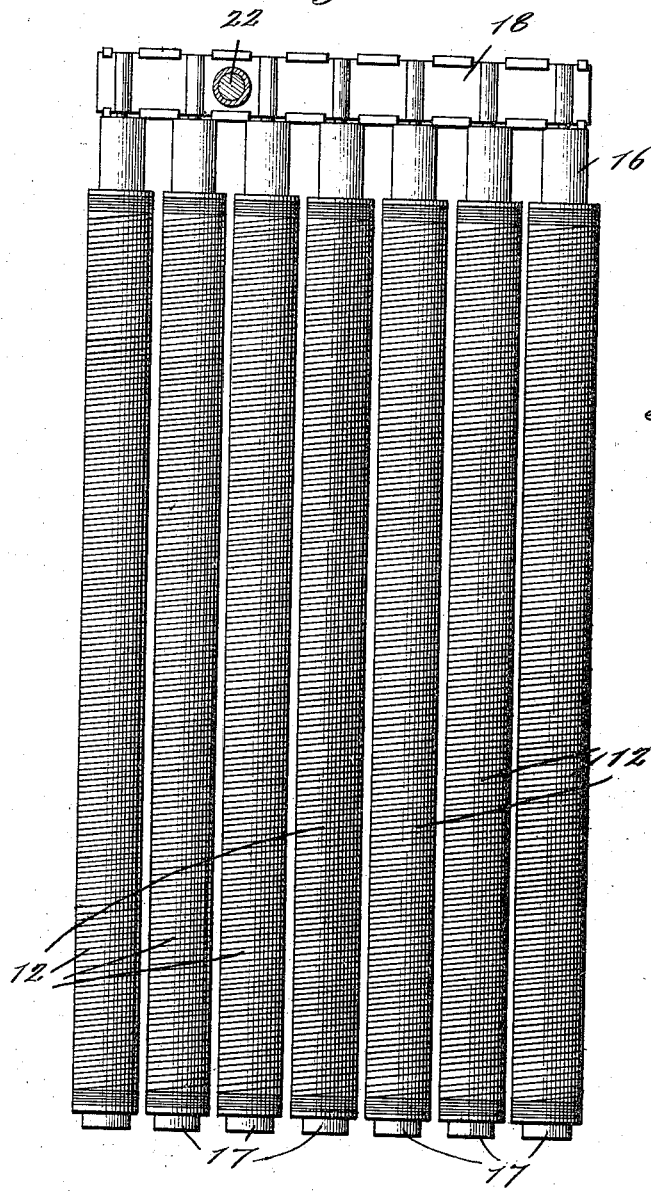
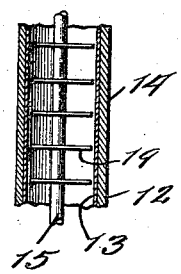

UNITED STATES PATENT OFFICE.

WILLIAM MORRISON, OF DES MOINES, IOWA.

REVERSIBLE GALVANIC BATTERY.

976,092.  Specification of Letters Patent.  Patented Nov. 15, 1910.

Application filed October 10, 1910. Serial No. 586,334.

*To all whom it may concern:*

Be it known that I, WILLIAM MORRISON, a citizen of the United States of America, and resident of Des Moines, Polk county, Iowa, have invented a certain new and useful Improvement in Reversible Galvanic Batteries, of which the following is a specification.

My invention relates to reversible galvanic batteries, and more particularly to a battery in which an alkaline electrolyte is used.

An object of my invention is to construct a reversible battery having a very high efficiency and one which may be charged and discharged a large number of times without any material deterioration of the various elements of my battery.

A further object is to provide a battery of very light weight in proportion to the horse-power developed.

A further object is to produce an improved battery in which the positive electrode or negative pole plate is composed of a compound of zinc and chromium such as described in my copending application, Serial No. 529,187, filed November 22, 1909, and in which the negative electrode or positive pole plate is composed of an oxid of silver and mercury, such as described in my copending application, Serial No. 531,230, filed Dec. 3, 1909, and in which an electrolyte of potassium hydroxid containing preferably a small amount of chromium, is used.

These and other objects of my invention will be more fully understood by reference to the accompanying drawings in which—

Figure 1:
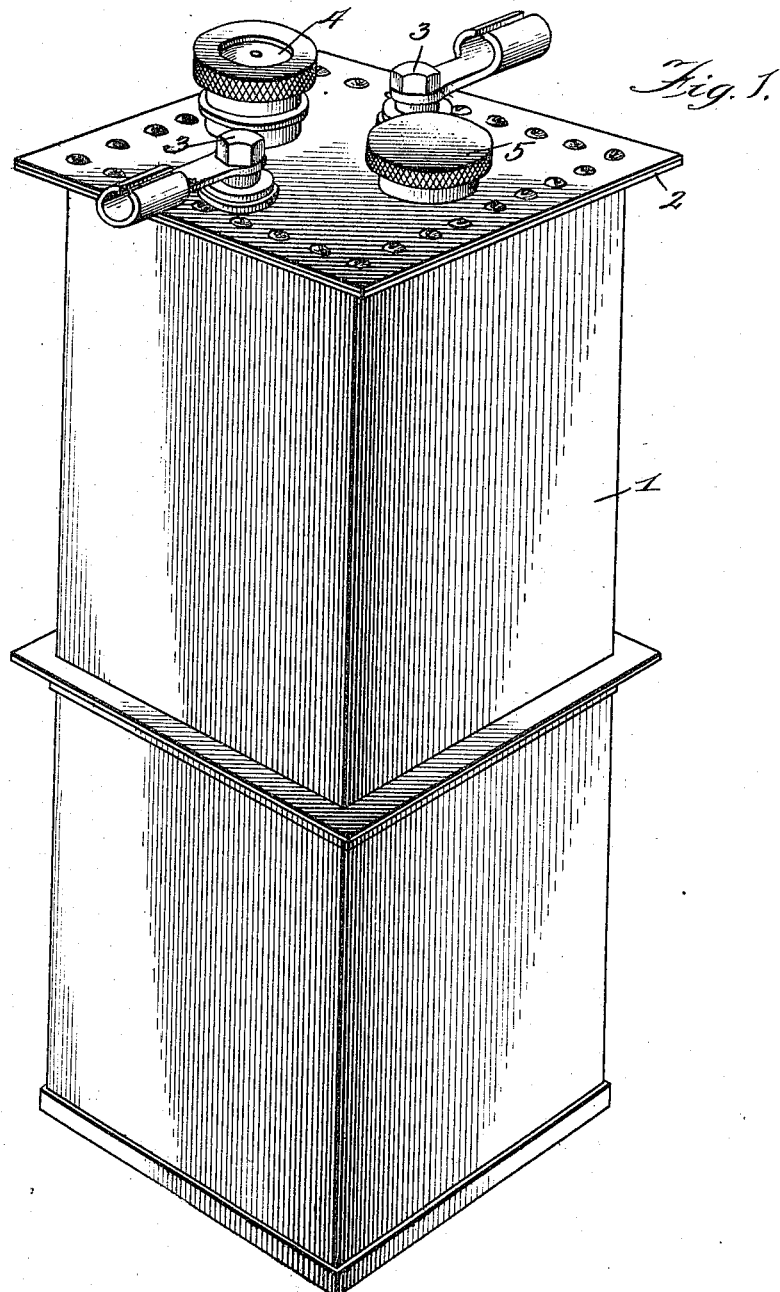
Figure 2:
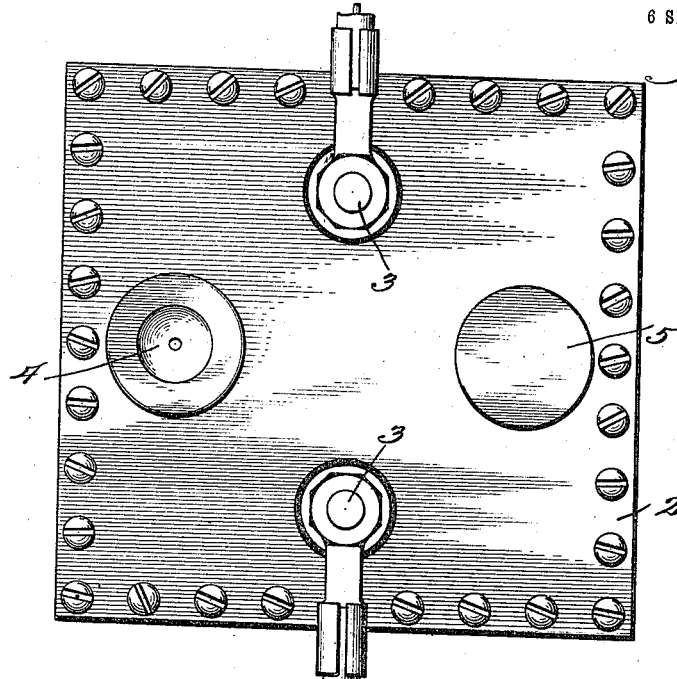
Figure 3:
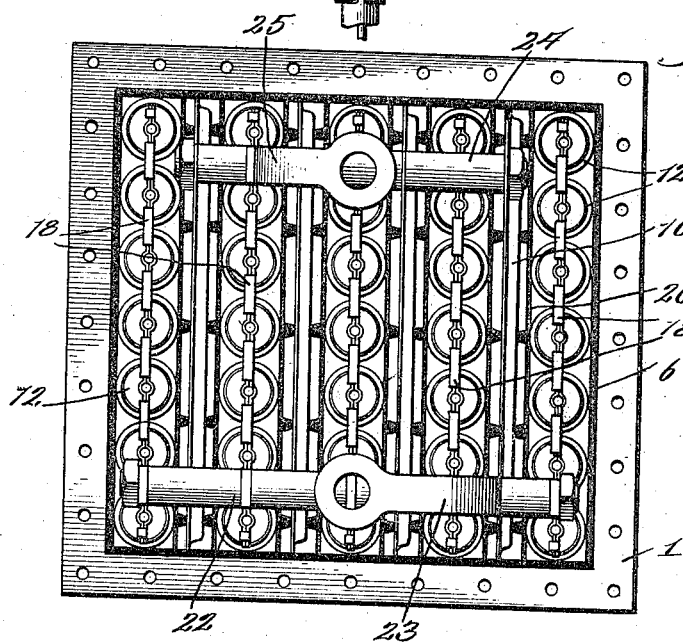
Figure 4:
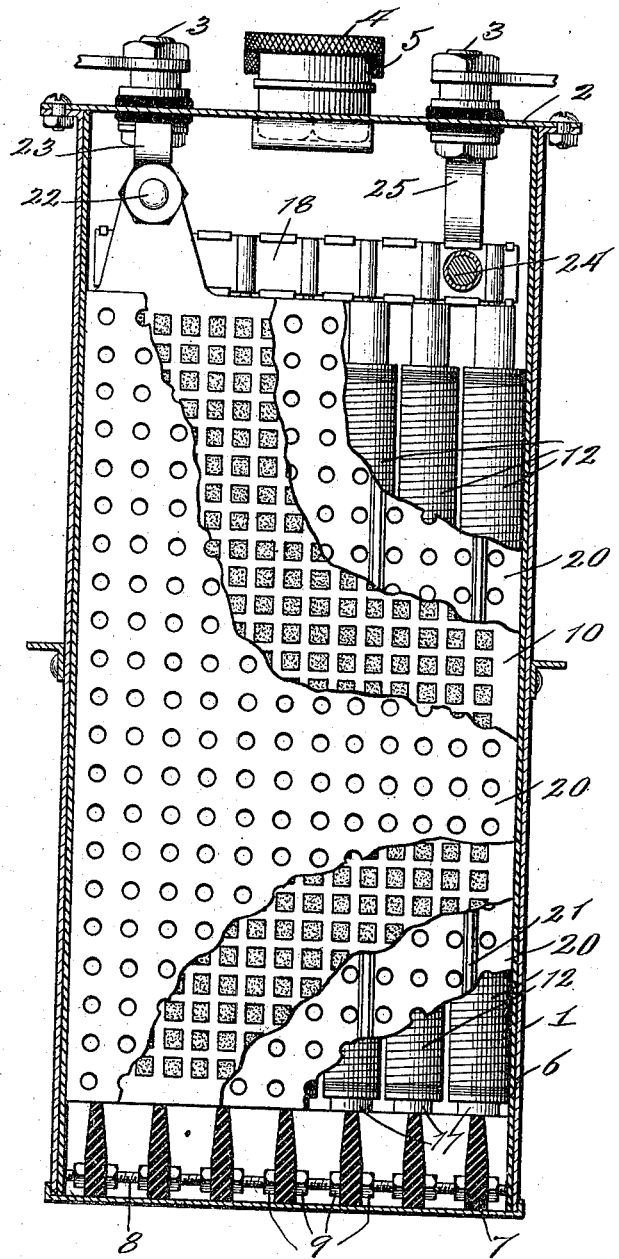
Figure 5:
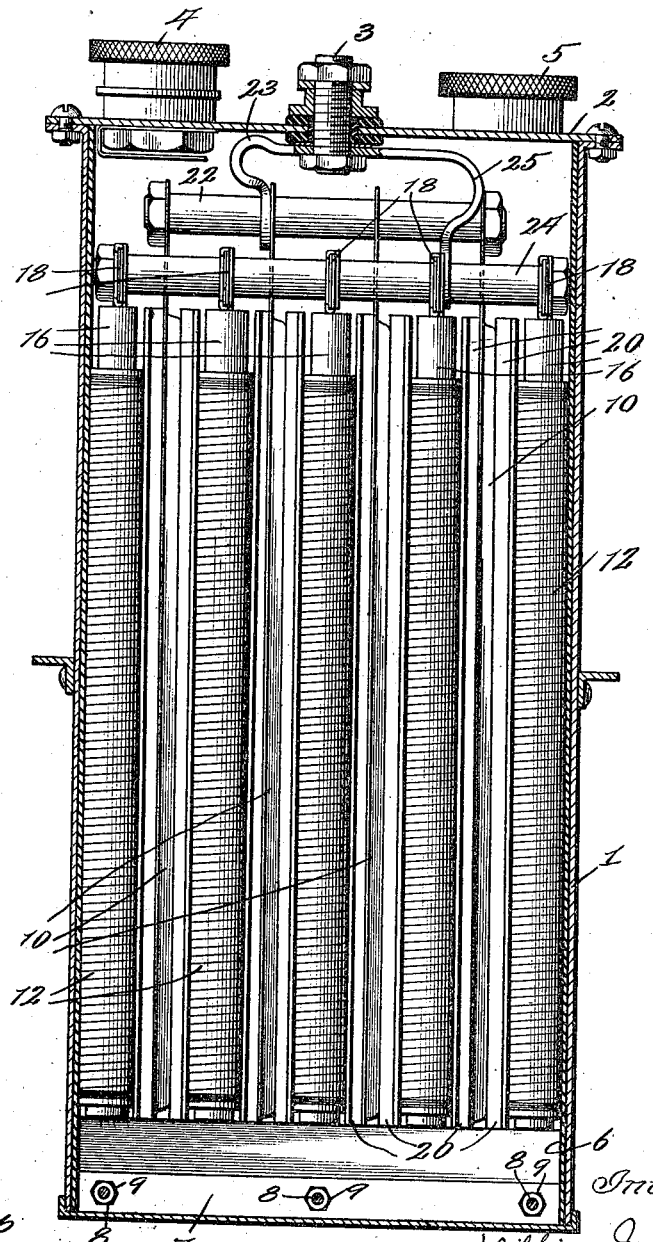
Figure 6:
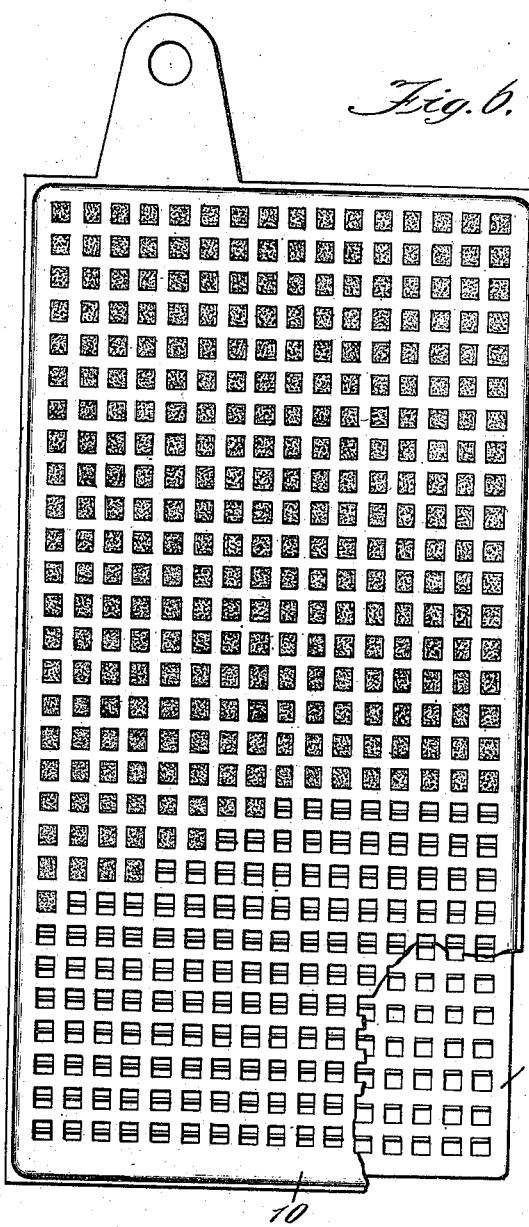

Figure 1 is a perspective view of a completed battery. Fig. 2 is a plan view of the same. Fig. 3 is a plan view with the cover removed in order to show the interior construction. Fig. 4 is a longitudinal cross section, with parts broken away in order to more fully show the interior construction. Fig. 5 is a cross sectional view taken on a plane at right angles to that of Fig. 4. Fig. 6 is a detailed view of one of the grids which make up the negative electrode. Fig. 7 is a detail showing the positive electrode. Fig. 8 is a cross sectional detail showing the internal construction of one of the tubes shown in Fig. 7.

Throughout the drawings like reference characters refer to similar parts.

As shown in Fig. 1 my battery consists of an exterior casing 1, composed of metal or other suitable material. A suitable cover 2 is employed through which extend the terminals 3 and upon which is located a suitable valve 4 and a cover 5 for the filling hole. The interior of this casing is lined with a suitable insulated lining 6 whereby all the parts are completely insulated from the metallic casing.

As shown in Figs. 4 and 5, there is located in the bottom of the casing an improved insulating support. This support comprises a plurality of sections 7 composed of rubber or other suitable material. Each of these sections are of such a length as to fit closely in the casing, as shown in Fig. 5, and the various sections are tied together with threaded rods 8 upon which are suitable nuts 9, located on these rods in the manner clearly shown in Fig. 4. Any desired number of these sections may be employed but I have shown seven, which is the same as the number of tubes which compose each positive electrode, as will more fully hereinafter appear. Supported transversely of these insulating sections are a plurality of grids in which the active material for the negative electrode is held. These grids are constructed in a manner similar to that described in my copending application, Serial No. 583,709, filed Sept. 26, 1910. As fully described in said application, and as shown in Fig. 6, each of the grids consists of two sections 10 and 11. Each of these sections is formed of sheet material, preferably copper, in which a plurality of openings are stamped out, these openings being formed by cutting the material upon three sides of each opening and then bending back the material upon the remaining side so as to form a metallic projection which extends into the active material of the completed grid. Copper is especially advantageous for the reasons that it is not rotted by absorbing mercury, as is nickel; its oxid is electrically conductive; and its oxid is not soluble in an alkaline solution containing a chromium compound, as is nickel oxid.

In the construction of the completed negative electrode the active material is first placed in the section 10 and then the section 11 pressed down upon the same under high pressure. The active material which I prefer to use for my negative electrode which is placed in the grids just described, is composed of an oxid of silver and mercury, which compound is more fully described in my copending application, Serial No. 531,230, referred to above. In the preparation of this active material, I take silver and mercury in the proportion of 1 pound of silver to from 5 to 9 pounds of mercury, and dissolve them in nitric acid. I then add caustic potash in excess of that necessary to precipitate and thus precipitate silver and mercury oxids. I then wash the precipitate in hot water, preferably containing a little caustic soda or potash, and dry the precipitate. This precipitate is then ready to be packed in the grids as above described.

The positive electrode consists of a suitable active material which is confined in a plurality of tubes 12, such as shown in Figs. 7 and 8. Each of these tubes is constructed in a manner similarly shown to that in my copending application, Serial No. 586,335, filed Oct. 10, 1910. Each tube consists of an interior lining 13 of heavy paper, and an exterior covering 14 of woven asbestos tubing or other similar material. In order to strengthen these paper-asbestos tubes, they may be either wound with wire or covered with a perforated metal tube. Extending through the center of each tube is a main conductor 15, which conductor projects into the plug 17 in the bottom of each tube and passes through the plug 16 which is inserted in the top of each tube. Care must be taken that the binding wire is insulated from this internal conductor. Each tube is divided into a plurality of sections by means of washers 19 which are placed at suitable distances apart upon the conductors 15. The series of tubes which go to make up each electrode plate are connected together by a suitable connector 18, as more fully described in my copending application. The active material is placed in these tubes between the washers, and the active material which I employ is composed of a compound of zinc and chromium mixed with an oxid of mercury, such as is described in my copending application Serial No. 529,187, referred to above. This compound may be obtained by various methods, but I find a very economical method is by taking a suitable quantity of sulfate of zinc and a sulfate of chromium and dissolving them, adding sufficient hydrate of potassium whereby a precipitate of a zinc salt containing chromium is obtained. This compound may be the zinc chromite, as known commercially, or may be another similar compound, depending upon the proportions which I first use. This precipitate is then thoroughly washed, preferably in hot water to which a little alkali has been added. I then dissolve mercury in nitric acid and by adding an alkaline solution an oxid of mercury is precipitated, which is also thoroughly washed, preferably in hot water. The two precipitates are then thoroughly mixed and the resulting mixture placed in the tubes in the manner described above. Another method by which I may produce this zinc chromium compound is by taking a suitable quantity of chromium sulfate and thoroughly dissolving this compound in hot distilled water. I then take a sufficient quantity of zinc oxid and stir the same thoroughly in water, preferably by means of an agitator, until the mixture is entirely free from lumps and a thin paste is obtained. Then add to this paste or mixture, while it is in an agitated condition, the chromium sulfate solution mentioned above. The proportions of the chromium compound and the zinc oxid can be varied to quite a large degree, but I find that good results are obtained by using three pounds of zinc oxid to one pound of chromium sulfate. The zinc oxid reacts on the green chromium sulfate solution to produce a clear solution and a light green precipitate containing zinc, chromium, sulfur and oxygen, in chemical association, which may be termed a sulfo-chromite. I then pour off the solution from this precipitate and add an excess of a strong solution of hot caustic potash. This caustic potash acts to form a solution of potassium sulfate and a precipitate of a zinc-chromium-oxygen compound. If suitable proportions are used in the first place, this compound may be zinc chromite, but when different proportions are used, other compounds of zinc and chromium will be obtained. I therefore do not wish to limit myself to zinc chromite. I then pour off the potassium sulfate solution from this zinc-chromium precipitate and wash the precipitate several times with hot water in order to remove all traces of the sulfate. The zinc-chromium compound which is obtained is then dried in any suitable manner and is then ready to be packed into the tubes, as above described.

These positive and negative electrodes constructed in the manner above described, are placed upon the supports 7 in alternate relation, and are separated by insulating sheets 20, each sheet being constructed in a manner well known in the art, and consisting of a sheet of perforated rubber or other similar material, upon which there are a plurality of longitudinal projections 21, whereby the electrodes are thoroughly insulated from each other and yet the electrolyte is allowed to pass readily around the same.

All of the negative electrode grids are connected together by a suitable bolt 22, which bolt is connected to one of the terminals 3 by a flexible connection 23, as clearly shown in Fig. 5. Likewise the positive electrodes are connected together by a suitable bolt 24 and a flexible connection 25 extending to the opposite terminal 3.

The safety valve 4 may be of any well known construction, and I, therefore, do not think it necessary to describe it in detail, as such valves are well known in the art.

The electrolyte which I prefer to use is composed of potassium hydroxid which contains preferably a small amount of chromium. This electrolyte fills the interior of the casing to a point just below the top of the plugs 16 in the tubes 12. These plugs being of insulating material, prevent the electrolytic action from passing directly to the conductors 15 and thus in effect prevent a partial short circuit.

In the operation of my battery in the charging and discharging the same, the following changes take place, as near as I am able to ascertain: The chemical changes, however, are very complicated and accordingly I do not wish to be held to limit myself to the exact reactions which I set forth, but in order to more completely understand the operation of this battery, I will give the chemical reactions as I understand them, after complete and thorough tests and experimenting with a complete battery. Before the battery is first charged the positive-pole plate consists, as above described, of oxids of silver and mercury, while the positive electrode or negative pole plate consists of a compound of zinc and chromium mixed with an oxid of mercury. This mercury when reduced by the electrolytic action merely acts as an amalgamator for the zinc but is not an active element. On the first charge the silver and mercury in the positive-pole electrode may take a higher degree of oxidation. The zinc-chromium compound in the negative-pole electrode is reduced to metallic zinc and potassium chromite, or some other potassium-chromium compound is formed.

Whether or not all of the zinc is reduced to metallic zinc depends upon the duration of the charge. The greater part, however, is ordinarily reduced. On the discharge the silver and mercury oxids of the positive-pole electrode are again reduced and if the positive electrode is of sufficient size and the discharge is carried on for a sufficient length of time, they will be reduced to a mixture of mercury and silver. Likewise on the discharge the potassium chromite of the negative-pole electrode, having a greater affinity for the zinc oxid resulting from the discharge than has the potassium hydroxid of the electrolyte, unites directly with the zinc oxid, to form the zinc-chromium-oxygen compound and potassium hydroxid in a concentrated state. In this reaction a zinc-chromium-potassium compound may also be formed, in which case the potassium hydroxid would not be set free. It will be noticed that the discharge of the negative-pole electrode takes place to a great extent independently of any action on the part of the electrolyte. In the subsequent charge the mercury in the positive-pole electrode is oxidized and the zinc-chromium compound in the negative-pole electrode is partially reduced to metallic zinc, and the same reactions then take place.

In this battery the active material of the positive-pole electrode may be held in an open grid, such as shown, without being washed away or being forced out of the same by any changes which take place during the charge and discharge. The active material of the negative-pole electrode, however, during the charge and discharge, undergoes a complete change, and it is, therefore, necessary to confine the same in order to prevent it from being forced out into the electrolyte. I have found that if this material is placed in an open grid, during the discharge it will be forced out through the openings in the grid and be washed away into the electrolyte.

A very important and essential feature in the construction of the positive electrode is in having the main conductor in the interior of the active material, as during the charge and discharge of the battery the electrolytic action seeks the best conductor, and, therefore, by my construction this electrolytic action commences on the inside and works out. This method of operation is very essential for the proper operation of this electrode, for the following reasons:

The nascent hydrogen combines with the oxygen of the zinc-chromium compound, which forms the active material in the tube and the potassium hydroxid combines with the chromium compound of this active material to form a potassium-chromium-oxygen compound. By having this central conductor, it will be readily seen that the electrolytic action takes place almost entirely inside of the tube and works outward, so that substantially all of the active material is acted upon more quickly and thoroughly. Furthermore, in the working of this electrode it is necessary, during the charge, that there be a concentrated solution of the potassium hydroxid inside of the electrode, in order that this hydroxid may combine with the chromium of the zinc-chromium compound, under the electrolytic action, in the most effective manner to form a potassium-chromium compound, so that the zinc may be reduced to the metallic state. If an external conductor were used, the hydrogen would be liberated on the exterior of the tube to a great extent, would escape through the solution into the air, and would not act effectively upon the zinc-chromium compound to reduce the same. Likewise the potassium oxid would unite with the water in the electrolyte to form potassium hydroxid, which would be in the main body of electrolyte instead of being confined as a concentrated solution with the active material. It will accordingly be seen that with this arrangement a proper operation of my electrode would not be attained.

It is further noted that it is necessary that there be a concentrated solution of potassium hydroxid inside of the tube. This concentrated solution is necessary to obtain a powerful discharge of the battery, in addition to the reasons above noted. This solution in the tube is more concentrated than that of the main electrolyte, and it is for that reason that it is very important that the active material be confined within the porous tubes described, so that there will be very little free circulation of the potassium hydroxid from the inside to the outside of the tube, as under these conditions it would be impossible to maintain the strong solution necessary upon the inside of the tube. Furthermore, I find it best to form the tubes cylindrical, as in this shape they are better able to resist the pressure from the inside, which is caused by the change in the condition of the material during the charge and discharge of the battery, as I have found that during this charge and discharge the material within the tube undergoes a complete structural change, and is under considerable pressure.

It is important in the charging of this battery that during the first stage it be charged at a high rate, in order to create a high current density to carry the electrolytic action immediately to the central conductor of the tube. This rate of charge may be cut down after the battery is partially charged, but for the best operation the rate of charging should be maintained slightly higher than the rate at which it is desired to discharge the battery.

A further important feature of the construction of my improved electrode is in the provision of the plugs 4 and 5 through which the conductor 6 passes. These plugs protect the ends of the rod so that the tubes may be surrounded with the electrolyte up to a point above the top of the tube, and yet a very small amount of the current will pass directly to the upper end of this conductor on account of the same being protected by the insulating plug. The lower end of the rod is protected in the same manner by the plug 4.

I claim:

1. A reversible galvanic battery comprising a negative-pole electrode containing an oxidizable metal and a chromium compound, a positive-pole electrode containing silver and mercury, and an alkaline electrolyte.

2. A reversible galvanic battery comprising a negative-pole electrode containing an oxidizable metal and a chromium-oxygen compound, a positive-pole electrode containing silver and mercury, and an alkaline electrolyte.

3. A reversible galvanic battery comprising a negative-pole electrode containing an oxidizable metal, a chromium compound and mercury, a positive-pole electrode containing silver and mercury, and an alkaline electrolyte.

4. A reversible galvanic battery comprising a negative-pole electrode containing an oxidizable metal, a chromium-oxygen compound and mecury, a positive-pole electrode containing silver and mercury, and an alkaline electrolyte.

5. A reversible galvanic battery comprising a negative-pole electrode containing zinc and a chromium-oxygen compound, a positive-pole electrode containing silver and mercury, and an alkaline electrolyte.

6. A reversible galvanic battery comprising a negative-pole electrode containing zinc, a chromium-oxygen compound and mercury, a positive-pole electrode containing silver and mercury, and an alkaline electrolyte.

7. A reversible galvanic battery comprising a negative-pole electrode containing an oxidizable metal and a chromium compound, a positive-pole electrode containing mercury, and an alkaline electrolyte.

8. A reversible galvanic battery comprising a negative-pole electrode containing an oxidizable metal and a chromium-oxygen compound, a positive-pole electrode containing mercury, and an alkaline electrolyte.

9. A reversible galvanic battery comprising a negative-pole electrode containing an oxidizable metal, a chromium compound and mercury, a positive-pole electrode containing mercury, and an alkaline electrolyte.

10. A reversible galvanic battery comprising a negative-pole electrode containing an oxidizable metal, a chromium-oxygen compound and mercury, a positive-pole electrode containing mercury, and an alkaline electrolyte.

11. A reversible galvanic battery comprising a negative-pole electrode containing zinc and a chromium-oxygen compound, a positive-pole electrode containing mercury, and an alkaline electrolyte.

12. A reversible galvanic battery comprising a negative-pole electrode containing zinc, a chromium-oxygen compound and mercury, a positive-pole electrode containing mercury, and an alkaline electrolyte.

13. In a reversible galvanic battery, an alkaline electrolyte, and a positive-pole electrode comprising a copper conductor or support and active material containing oxids of mercury and silver.

14. In a reversible galvanic battery, an alkaline electrolyte, and a positive-pole electrode comprising a conductor or support of copper and an active material containing oxid of mercury.

15. In a reversible galvanic battery, an alkaline electrolyte containing chromium, and a positive-pole electrode having a conductor or support of copper.

16. In a reversible galvanic battery, an alkaline electrolyte, a positive-pole electrode having active material containing mercury and another metal, and a negative pole-electrode insoluble in the electrolyte.

17. In a reversible galvanic battery, an alkaline electrolyte, a positive-pole electrode having active material containing mercury and silver, and a negative-pole electrode insoluble in the electrolyte.

18. In a reversible battery, an alkaline-hydrate electrolyte, a negative-pole electrode containing zinc, a positive-pole electrode, and means for preventing solution of the zinc in the electrolyte.

19. In a reversible battery, an alkaline-hydrate electrolyte, a negative-pole electrode containing zinc and a compound capable of rendering zinc oxid or hydroxid substantially insoluble in the electrolyte, a positive-pole electrode, and a porous separator impermeable to zinc oxid or hydroxid between said electrodes.

Signed by me at Washington, District of Columbia this 8th day of October 1910.

WILLIAM MORRISON.

Witnesses:
Jos. H. Blackwood,
H. A. Swenarton.